US005950205A

United States Patent [19]
Aviani, Jr.

[11] Patent Number: 5,950,205
[45] Date of Patent: Sep. 7, 1999

[54] DATA TRANSMISSION OVER THE INTERNET USING A CACHE MEMORY FILE SYSTEM

[75] Inventor: James A. Aviani, Jr., Santa Barbara, Calif.

[73] Assignee: Cisco Technology, Inc., San Jose, Calif.

[21] Appl. No.: 08/937,966

[22] Filed: Sep. 25, 1997

[51] Int. Cl.[6] .................................................. G06F 17/30
[52] U.S. Cl. .............................. 707/103; 707/205; 711/3; 711/135
[58] Field of Search ..................................... 707/103, 205; 710/5, 36; 711/129, 162, 134, 135; 345/502; 348/7; 395/670, 674, 675, 200.49, 200.61

[56] References Cited

U.S. PATENT DOCUMENTS

| | | | |
|---|---|---|---|
| 4,827,411 | 5/1989 | Arrowood et al. | 364/300 |
| 4,965,772 | 10/1990 | Daniel et al. | 364/900 |
| 5,357,618 | 10/1994 | Mirza et al. | 711/3 |
| 5,446,839 | 8/1995 | Dea et al. | 345/502 |
| 5,555,244 | 9/1996 | Gupta et al. | 370/60.1 |
| 5,673,265 | 9/1997 | Gupta et al. | 370/432 |
| 5,680,573 | 10/1997 | Rubin et al. | 711/129 |
| 5,805,821 | 9/1998 | Saxena et al. | 395/200.61 |
| 5,829,046 | 10/1998 | Tzelnic et al. | 711/162 |
| 5,832,297 | 11/1998 | Ramagopal et al. | 395/825 |
| 5,838,916 | 11/1998 | Domenikos et al. | 395/200.49 |
| 5,890,100 | 1/1999 | Feiste et al. | 711/135 |
| 5,890,169 | 3/1999 | Wong et al. | 707/206 |

OTHER PUBLICATIONS

Valloppillil, Vinod, "Cache Array Routing Protocol v1.0", Oct. 20, 1997, Internet–Draft, http://ds1.internic/net/internet–drafts/draft–vinod–carp–v1–02.txt, pp. 1–6.

Cisco Technology, Inc., "Configuring IP Routing Protocols," Dec. 10, 1997, http://www.cisco.com/univercd/data/doc/software/11 2/cnp1/5ciprout.htm#REF40277, pp. 1–6, 120–122.

Ousterhout, John K., "A Trace–Driven Analysis of the UNIX 4.2 BSD File System," Jan. 2, 1993, *Computer Science Division, Electrical Engineering and Computer Science,* University of California, Berkeley, CA, pp. 1–12.

Welch, Brent, "A Comparison of the Vnode and Sprite File System Architectures," *Proceedings of the File System Workshop,* May 1992, pp. 29–44.

Ousterhout, John K., "Beating the I/O Bottleneck: A Case for Log–Structured File Systems," Jan. 30, 1992, Computer Science Division, Electrical Engineering anc Computer Sciences, University of California, Berkeley, CA, pp. 1–17.

*Primary Examiner*—Paul R. Lintz
*Assistant Examiner*—Ella Colbert
*Attorney, Agent, or Firm*—Beyer & Weaver, LLP

[57] ABSTRACT

A method for storing a plurality of multimedia objects in a cache memory is described. First ones of the multimedia objects are written into the cache memory sequentially from the beginning of the cache memory in the order in which they are received. When a first memory amount from a most recently stored one of the first multimedia objects to the end of the cache memory is insufficient to accommodate a new multimedia object, the new multimedia object is written from the beginning of the cache memory, thereby writing over a previously stored one of the first multimedia objects. Second ones of the multimedia objects are then written into the cache memory sequentially following the new multimedia object in the order in which they are received, thereby writing over the first ones of the multimedia objects. This cycle is repeated, thereby maintaining a substantially full cache memory.

24 Claims, 11 Drawing Sheets

DATA TRANSMISSION OVER THE INTERNET USING A CACHE MEMORY FILE SYSTEM

BACKGROUND OF THE INVENTION

The present invention relates to transmission of data in a network environment. More specifically, the present invention relates to methods and apparatus for improving the efficiency with which data are transmitted over the Internet. Even more specifically, the invention relates to a file system designed with the special requirements of a cache memory in mind.

Currently, most Internet service providers (ISPs) employ various techniques such as, for example, caching proxy servers, to accelerate access to the World Wide Web. Having evolved from early firewall models, caching proxy servers service data requests intended for the Web using data stored locally from previous similar requests. For historical reasons, the file system employed by such a proxy server is a Unix-based general purpose file system. Unfortunately, while Unix-based file systems are extremely versatile and useful in the applications for which they were designed, they are not optimized for the caching function and, in fact, represent the primary traffic bottleneck in caching proxy servers.

The basic requirements of a Unix-based file system are that its files are persistent and mutable. That is, once a file is created, the user can reasonably anticipate that the file will remain there forever, i.e., persistence, or at least until he explicitly deletes it. Moreover, a file, once created, may be changed at any time, i.e., mutability. By contrast, the basic requirements of a caching file system are just the opposite. That is, because there is a finite amount of memory in which the most recently and frequently requested objects must be stored, older files become obsolete. Thus, files in a caching file system should be transient. Moreover, objects stored in a caching file system are downloaded, read a number of times before being deleted or overwritten (many times if the cache is operating efficiently), but never modified. Thus, files in a caching file system should be immutable.

The Unix file system was designed with the expectation that a relatively small number of relatively large files would be stored within its multilevel hierarchy. This is in contrast to millions of small files, e.g., multimedia objects, typically stored in a caching proxy server. The small number of files anticipated meant, in turn, that a correlatively small number of "creates" were expected. Because only a small amount of time overhead was anticipated to be associated with the "create file" function, it was not optimized for speed. By contrast, caching proxy servers create files at a rate well beyond that anticipated for a Unix-based system, e.g., 1000 creates/second. Therefore, the create function must be fast.

The multilevel directory structure itself has a rather large overhead, consuming about 20% of available storage. This represents an inefficiency in a caching file system which, by its very nature, needs to make use of as much of its memory as possible for the storage of cache objects. In addition, because of the multilevel nature of the directory structure, significant time is required to traverse the directory levels when searching for files. This overhead becomes problematic given the number of transactions per unit time typical for a caching proxy server. The overhead is also problematic in that the Unix-based file system is scaleable only to about 20–25 Gigabytes at which point it becomes unacceptably unwieldy and slow. This is unfortunate because current Internet traffic is already pushing this limit and it is obviously desirable to increase cache capacity as traffic increases.

Finally, an extremely important feature of a caching file system, i.e., garbage collection, is not typically provided in a Unix-based file system. Rather, in such a file system it is assumed that the user will delete files and optimize the disk as needed. Therefore, if a Unix-based file system is to be used as a caching file system, a separate, process must be designed with the capability of repeatedly searching through the complex directory structure and identifying and flushing obsolete files. This garbage collection process must not begin flushing objects too soon or the disk space will be underutilized and the cache hit rate correspondingly lowered. On the other hand, the process must not wait too long to begin garbage collection because the performance of the file system bogs down as the disk becomes full. Thus, not only must a separate process be designed to perform the necessary garbage collection function, it must be an extremely sophisticated process, therefore significantly increasing the already large overhead associated with the file system.

The Unix-based file system currently employed by ISP proxy servers incorporates file characteristics (persistence and mutability) which are opposed to the requirements of a caching file system. It is based on a multilevel directory structure which is problematic for the caching function in a number of respects. Finally, because it does not provide garbage collection, a separate, highly complex process must be designed. It is therefore apparent that a file system is desirable which is more in line with the requirements of the caching function.

SUMMARY OF THE INVENTION

According to the present invention a file system is provided which is designed specifically with regard to the requirements of a caching file system. The file system of the present invention essentially organizes the memory of a caching server as a large first-in-first-out (FIFO) memory. Files are referenced in a single level directory structure and are identified by a file name and a memory location offset. These files are immutable and transient and the directory itself may be named arbitrarily by the user. As is desirable for a caching file system, garbage collection is inherent in the system thereby eliminating the need for creation of a separate collection process. According to a specific embodiment, a flush pointer is positioned in the cache memory just ahead of a write pointer. In general, the free disk space, i.e., the memory available for new file creation, is just the distance between the write and flush pointers. The situations in which this is not the case will be discussed below. When a new file is to be created, the flush pointer is moved past currently stored files one at a time until there is enough space behind the flush pointer (and ahead of the write pointer) for the new file. The write pointer is then moved enough to accommodate the new file and the new file data is written over the old files. The write pointer follows the flush pointer in this manner through the cache memory, eventually wrapping around the disk and beginning the process again. Because, in general, the flush pointer is only barely ahead of the write pointer, the cache memory is always substantially full. This is a desirable condition for efficient operation of the caching function because a full cache memory increases the probability of cache hits.

Thus, the present invention provides a method for storing a plurality of objects in a cache memory. First ones of the objects are written into the cache memory sequentially from the beginning of the cache memory in the order in which they are received. When a first memory amount from a most recently stored one of the first objects to the end of the cache memory is insufficient to accommodate a new object, the new object is written from the beginning of the cache memory, thereby writing over a previously stored one of the first objects. Second ones of the objects are then written into the cache memory sequentially following the new object in the order in which they are received, thereby writing over the first ones of the objects. This cycle is repeated, thereby maintaining a substantially full cache memory.

In a specific embodiment, the invention provides a method for storing a first object in a cache memory using a write pointer to indicate a most recently allocated memory portion and a flush pointer to indicate a most recently flushed object. The size of the first object is first determined. Then, a first memory amount available for writing the first object is determined with reference to the write and flush pointers. Where the first memory amount is insufficient to accommodate the first object, the flush pointer is moved to the end of a next flushed object immediately following the most recently flushed object, the next flushed object then becoming the most recently flushed object. The first memory amount is determined and the flush pointer is moved in this manner until the first memory amount is sufficient to accommodate the first object. Where the first memory amount is sufficient to accommodate the first object, the write pointer is moved to allocate a second memory amount corresponding to a first portion of the cache memory, the second memory amount being smaller than the first memory amount and also being sufficient to accommodate the first object. The first object is then written in the first portion of the cache memory.

A further understanding of the nature and advantages of the present invention may be realized by reference to the remaining portions of the specification and the drawings.

DESCRIPTION OF THE PREFERRED EMBODIMENT

Figure 1:
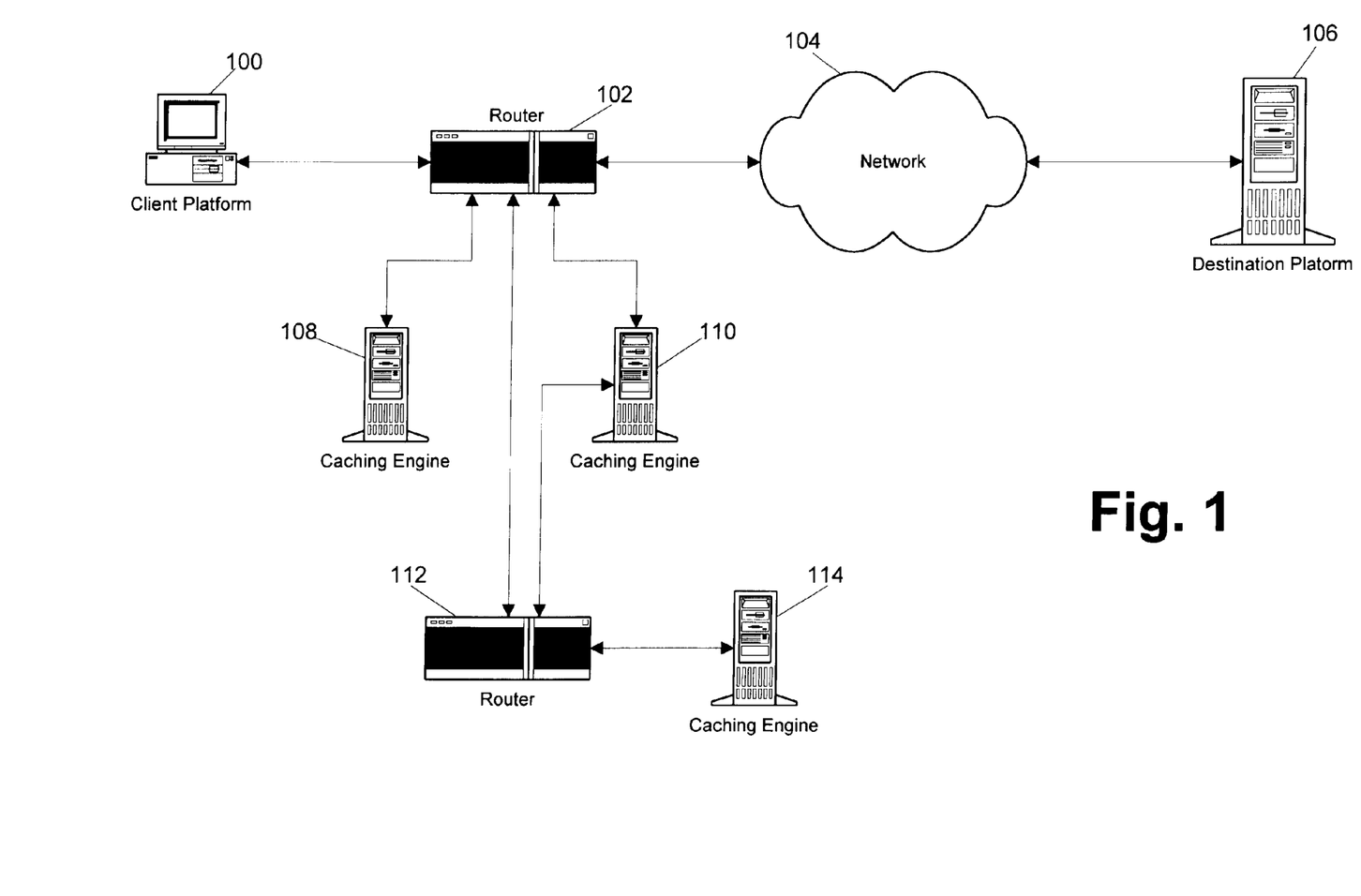
FIG. 1 is a diagram of a hardware environment in which a specific embodiment of the invention may be employed.

FIG. 1 shows an example of a hardware environment in which the present invention may be implemented. A client platform 100 is connected to router 102 which is connected via network 104 to destination platform 106. It will be assumed for the purposes of this discussion that client platform 100 is a single personal computer, that router 102 connects platform 100 to the Internet, i.e., network 104, and that destination platform 106 is a server on the World Wide Web. It should be noted, however, that a variety of configurations similar to this simple model may be employed without departing from the scope of the invention. For example, client platform 100 could be personal computer or workstation which is part of a local or wide area network. Router 102 could be an internal router in such a network (e.g., an intranet connection to an internal web page), the network's general gateway to the Internet, a direct connection to destination platform 106, or some intermediate platform between the network and destination platform 106. The connection between router 102 and client platform 100 could include several intervening routers. Network 104 could represent a local or wide area network which includes client platform 100 and router 102, or the Internet. Destination platform 106 could be part of the local or wide area network, or a remote server on the Internet. Caching engines 108 and 110 are connected to router 102. Additional router 112 is connected to router 102 and has an additional caching engine 114 connected thereto.

Initially, client platform 100 transmits a request to retrieve data such as, for example, a multimedia object from destination platform 106. Cache-enable router 102 receives the request in the form of at least one data packet. Router 102 reads the packet header to determine whether, for example, it is a TCP packet and indicates port 80 as its destination port. If the packet is of a different protocol or is not destined for the World Wide Web, the packet is simply passed through the router and routed according to standard Internet protocols.

If, on the other hand, the packet is TCP and port 80 is specified, router 102 determines to which of its associated caching engines (108 and 110) it will redirect the packet based on the destination IP address specified in the packet. Before sending the packet to one of its associated caching engines, router 102 encapsulates the packet for transmission to the selected caching engine by adding another TCP/IP header which designates the router as the source of the packet and the caching engine as the destination. That is, the router encapsulates the packet for transmission to a caching engine which might be several "hops" away. So, for example, router 102 might encapsulate the packet for transmission to caching engine 114 which is connected to router 102 via router 112. Thus, not only may multiple caching engines be associated with a particular router, but multiple routers may be supported by an individual caching engine or a group of caching engines. This allows a tremendous amount of flexibility in where the caching engine and router need to be in relation to each other.

Router 102 opens a TCP connection between the client and the selected caching engine and transmits the encapsulated packet to the caching engine. The caching engine determines if it has the requested object stored locally by comparing the packet URL to its directory. If the object is not in the cache, the caching engine makes its own request for the object (using its own address as the source IP address) to destination platform 106 via router 102. That is, router 102 establishes a TCP connection between the caching engine and destination platform 106. The router sees that the new request is from the caching engine (by looking at the source address) and thereby knows not to redirect the packet to the caching engine. This request and the subsequent retrieval of the object from destination platform 106 is done according to standard TCP/IP protocols. The retrieved object is then placed in the memory of the caching engine and transmitted to client platform 100. If, on the other hand, the object is determined to be locally stored in the caching engine, it is transmitted to client platform 100.

It will be understood that the above-described caching system may be implemented using any of a variety of file systems for the caching engines. However, as discussed above, a file system specifically designed with regard to the requirements of such a caching engine will result in greater overall system efficiency. Such a file system will now be described with reference to FIGS. 2–10.

Figure 2:
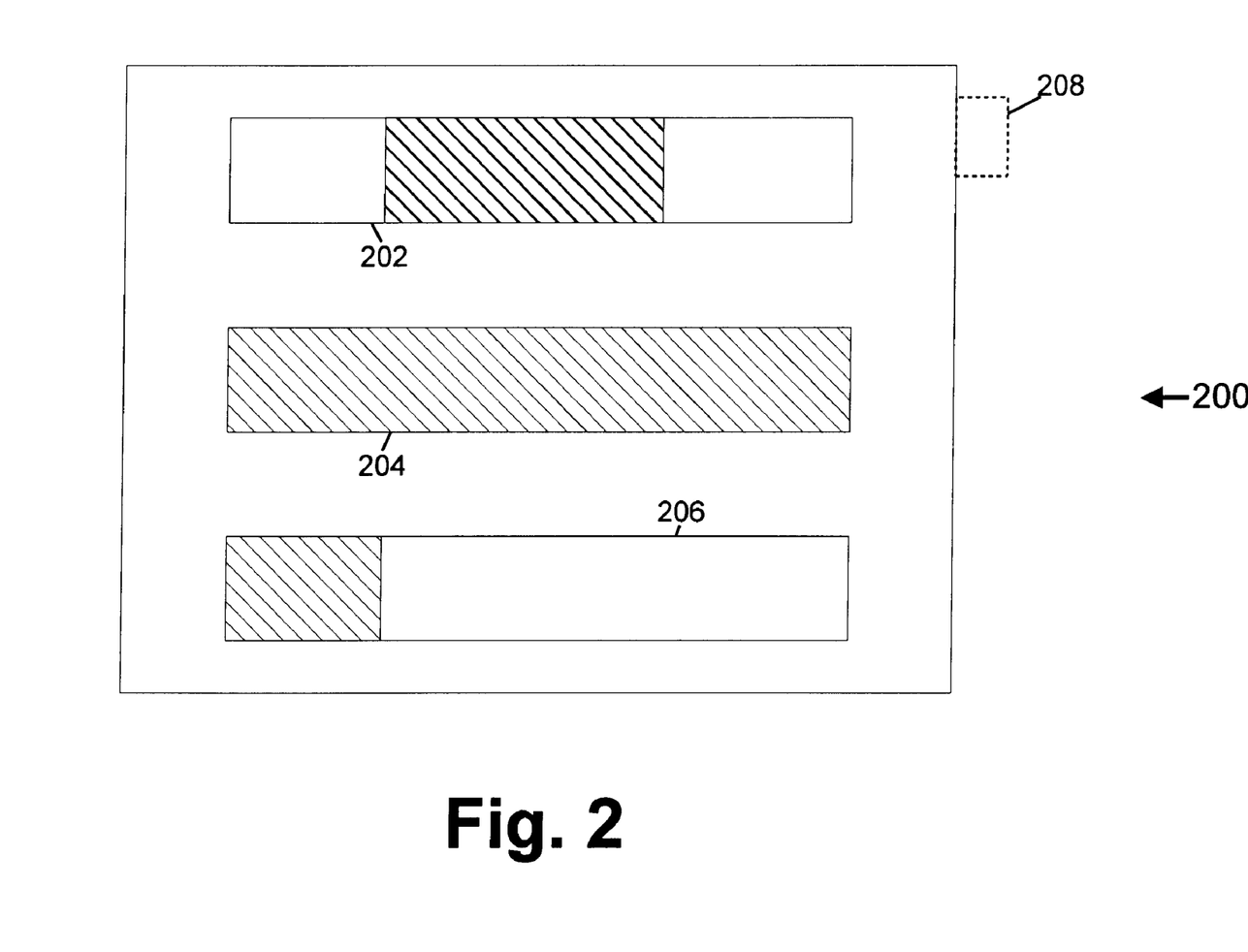
FIG. 2 is a diagram of a caching engine for use with a specific embodiment of the present invention.

FIG. 2 is a diagram of a caching engine 200 for use with a specific embodiment of the file system of the present invention. Caching engine 200 includes three SCSI drives 202, 204 and 206. According to a specific embodiment, the shaded portions of the drives correspond to the memory actually being used for the caching function, i.e., for the storing of cache data. This allows for the other portions of the drives to be used for other purposes. Typically, however, all of each of the drives would be used for the storage of cache objects. Upon initialization of the file system a disk drive table is created which lets the file system know the number of drives, the size of the drives, and the locations of the data. The disk drive table specifies each drive name, the starting location of the data on the drive, and the length of the data.

According to a specific embodiment, the directory structure of the present invention for each of the disk drives is stored in the caching server's volatile memory, e.g., the server's RAM. However, because the file system of the present invention is intended to store potentially tens of millions of objects it is untenable to store the full names of all of these objects in the volatile memory because the directory structure would quickly consume all of the volatile memory. Instead, an MD5 hash is kept in volatile memory which correlates the object names with memory offsets. Certain advantages are realized as a result of the fact that the directory structure is stored in volatile memory. For example, the file system is less vulnerable to corruption from hardware failures because, as discussed below, the directory, i.e., the MD5 hash, may easily be rebuilt from information in the disk drives when the system reboots. Also, because the directory is in volatile memory rather than in the disk drive, access to the file system is extremely fast.

The offset points to an Inode at the beginning of an associated object on the disk drive. The term "Inode" (or index node) as used herein, describes a fixed size data field at the beginning of each object in the cache which is analogous to a similarly named feature in the Unix environment. The Inode of the present invention is an abstraction of the data in the associated file which provides specific information about that file including, for example, the file name, its memory offset, and the current write pointer location. The Inode has a fixed length because it stores only the first 256 bytes of the file name. And while the full file name is not provided in the Inode, the odds are extremely low that a false positive match between the requested file name and the 256-byte name field in the Inode will occur.

When a directory look-up is performed for a particular file name and the name in the referenced Inode does not match the file name, the file is assumed not to be in the cache. Each directory entry is very compact, e.g., a 120-bit hash and a 31-bit offset value. The specific size of the directory entry depends, of course, on the hash algorithm being used. The directory look-up employs a binary search which is an efficient search algorithm. Moreover, the binary search is performed primarily in volatile memory (except for retrieving the Inode). Therefore, the directory look-up is extremely fast.

When an object is written to the disk, the amount of space is determined and then the Inode information is filled in. This information includes a variety of meta-information about the object including the first 256 bytes of the object name, the creation date, and the size of the object. The Inode reference is inserted into the directory and the object is subsequently written to the disk with a sequential write as the data comes in. File creation is protected by a mutex until the entry is inserted in the directory to avoid the possibility of some other transaction thread coming in and trying to create the same file. However, once the directory entry has been inserted and the object data has begun to be written, any subsequent attempt to create will realize the file has already been created and perform a simple read instead. If the data is still being written, the read will come in right behind and read the data as it is written.

In a more specific embodiment, the disk drive(s) are partitioned into several partitions each having an MD5 hash associated with it. That is, each partition has its own directory structure, disk pointers, etc. This is useful where the total disk capacity is so large that one MD5 hash would be too large to handle efficiently. In such an embodiment, a 32-bit CRC hash correlating a file name to a particular partition may be used to identify in which MD5 hash to perform a directory look-up for the file name. In a still more specific embodiment, each partition is further divided into smaller partitions and the offset associated with the file name in the MD5 hash also indicates in which of the smaller partitions the file can be found. Alternatively, each of the smaller partitions could have a smaller MD5 hash associated with it which is referenced by the larger MD5 hash associated with the larger partition. Not only are such smaller hashes more manageable, if one partition gets corrupted, the rest of the file system is isolated from the corruption. That is, only a relatively small portion of the total cache capacity needs to be rebuilt.

It will be understood that, notwithstanding the references to specific types of hashes, a wide variety of hash algorithms may be employed to implement various aspects of the present invention. For example, the following hash algorithms may also be employed: 8-bit, 16-bit, and 32-bit CRCs; MD4; MD5; the secure hash standard (SHS) being developed by the U.S. Department of Commerce; etc. Thus, a wide variety of hash algorithms may be employed as long as the requisite functionality is supported.

According to another specific embodiment, the directory structure of the present invention is stored in a separate IDE drive 208. The single level directory structure is essentially a table of offsets and identifiers, e.g., a B-tree, identifying the names and locations of data objects stored in SCSI drives 202, 204 and 206. Although the IDE drive is slower than the SCSI drives, it is less costly. In addition, given the small amount of information transferred, the penalty for access to the directory structure can be tolerated.

FIGS. 3a–3h illustrate operation of a caching file system according to a specific embodiment of the present invention. This embodiment is described with reference to a single memory drive 300. However, it will be understood that the following description may easily be generalized to include the combined SCSI drives of FIG. 2, or a variety of other memory configurations. That is, drive 300 is shown as a single entity for illustrative purposes only. Drive 300 has a disk pointer file 302 stored at the beginning of the drive which includes a minimum location and a maximum location between which data are stored, a checksum (to check for data corruption), a write pointer location (represented by arrow 304), and a flush pointer location (represented by arrow 306). Initially, i.e., when nothing has been written to drive 300, write pointer 304 and flush pointer 306 are at the same location. As will become clear, this is the only time at which both pointers are at the same location.

Figure 3A:
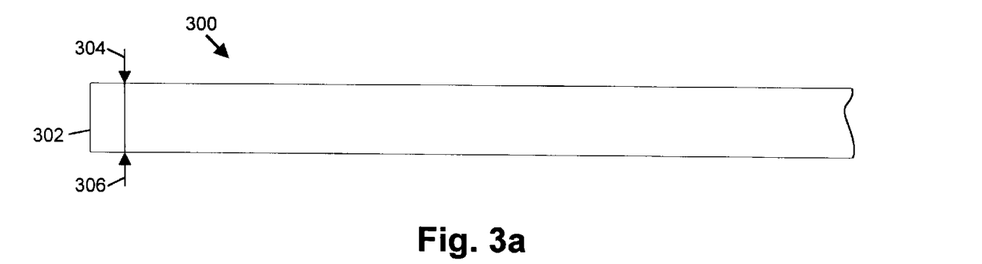
FIGS. 3a–3h illustrate operation of a caching file system according to a specific embodiment of the present invention.
Figure 3B:
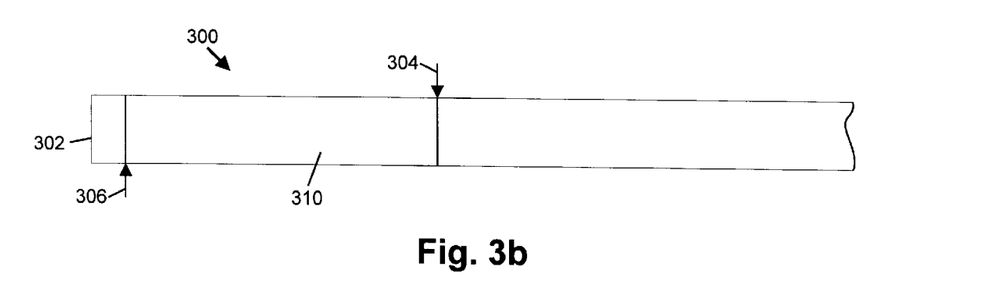
Figure 3C:
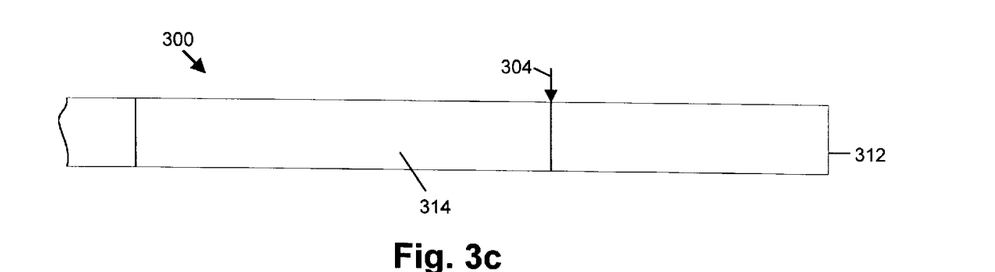
Figure 3D:
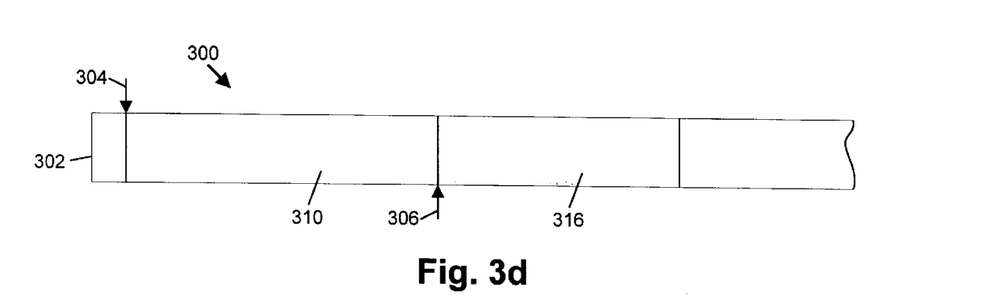

When the first object is written to drive 300, i.e., file 310, write pointer 304 is moved to the end of file 310 at which location a new file may be written (FIG. 3b). Write pointer 304 is moved to the end of each newly created file in this manner until the drive is substantially full and write pointer 304 nears the end 312 of drive 300 as shown in FIG. 3c. If, at this point, a new file is to be created which is larger than the amount of memory between the current location of write pointer 304 (at the end of file 314) and the end of the drive, write pointer 304 is wrapped around to the beginning of drive 300 as shown in FIG. 3d. This is done because the sequential reading of objects is extremely efficient and becomes less so when files are fragmented. Moreover, the drive is so large that the number of times this occurs as compared to the number of creates is very small. Finally, unless you are very unlucky, the amount of memory left open at the end of the disk will typically be very small. It is important to note that, before write pointer 304 is wrapped around in the manner described above, flush pointer 306 is moved to the end of the first file in the drive, i.e., file 310, so that it remains ahead of write pointer 304 for future write operations (see FIG. 3d). Thus, once drive 300 is full, flush pointer 306 remains just ahead of write pointer 304 for the remainder of the operation of the file system.

Figure 3E:
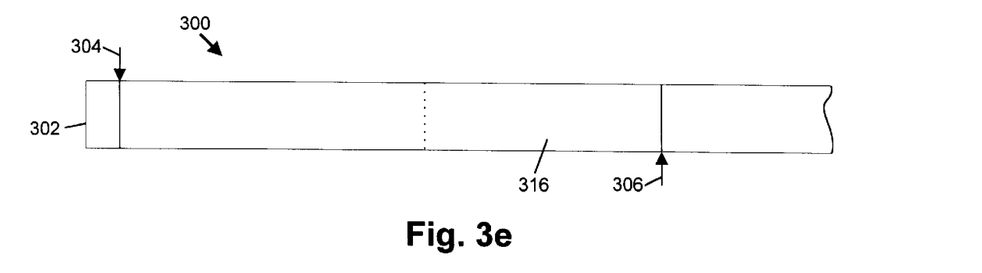
Figure 3F:
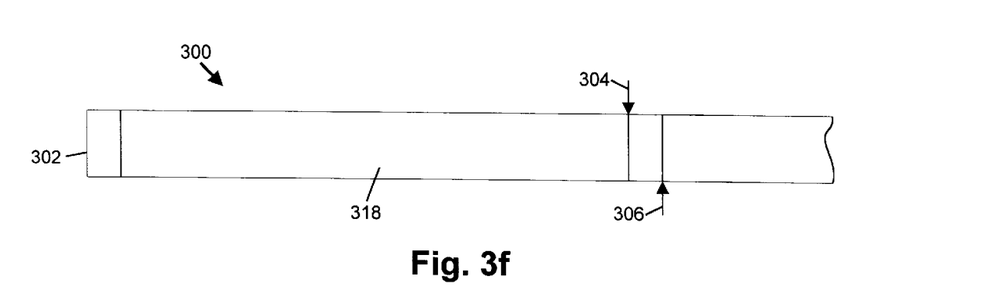
Figure 3G:
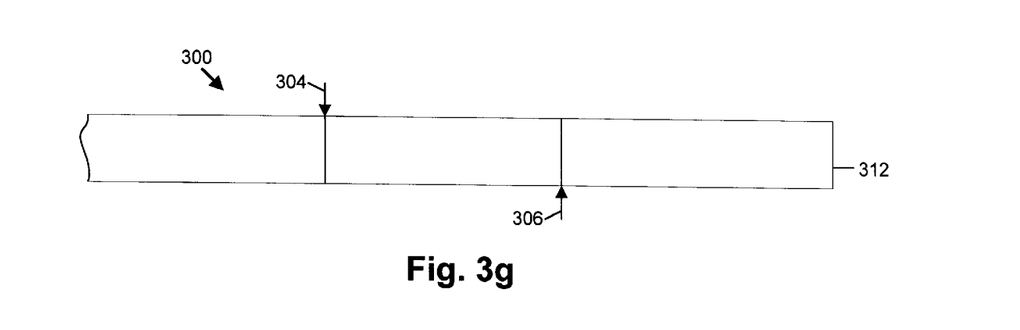
Figure 3H:
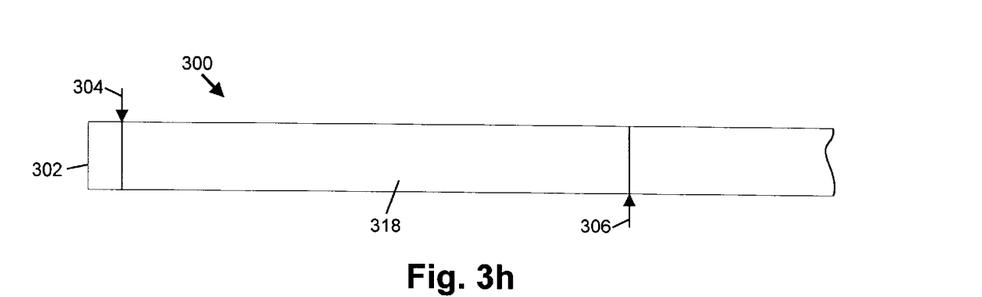

If the new file to be created will not fit between write pointer 304 and flush pointer 306 as positioned in FIG. 3d, flush pointer 306 is moved to the end of each successive object until enough room is allocated for creating the new file. In this example, flush pointer 306 is moved to the end of the next object (i.e., file 316) to allocate enough space for the creation of the new file as shown in FIG. 3e. Write pointer 304 is then moved and new file 318 is written over file 310 and a portion of file 316 as shown in FIG. 3f. Files continue to be created and write pointer 304 follows flush pointer 306 in this manner until they near the end 312 of drive 300 as shown in FIG. 3g in which write pointer 304 is at the end of newly created file 320 and flush pointer 306 is at the end of earlier created file 314 (a portion of which has been written over by file 320). If the next file to be created will not fit in between write pointer 304 and flush pointer 306, and it will not fit between write pointer 304 and the end 312 of drive 300, the pointers wrap the drive and write pointer 304 is once again at the beginning of drive 300 while flush pointer is positioned at the end of previously created file 318. As before, flush pointer 306 will be moved to the end of each successive file beginning with file 318 until enough space is available between the two pointers for creation of the new file.

The above-described example serves to illustrate some of the advantages of the file system of the present invention. For example, it is a well understood principle that cache memories work better when they are full because the odds of a cache hit are correlatively maximized. As illustrated by FIGS. 3a–3h, once write pointer 304 makes its first traverse of drive 300, the drive is substantially full at all times with only a negligible amount of memory unused at the end of the drive. This is to be contrasted with a Unixbased file system in which about 20% of the available memory is needed for the directory overhead and the remaining 80% can't be fully utilized because of drive performance concerns. In addition, with the present invention, garbage collection is inherent in the operating system in that older files are automatically written over, thereby eliminating the need for development of an additional garbage collection process.

Figure 4:
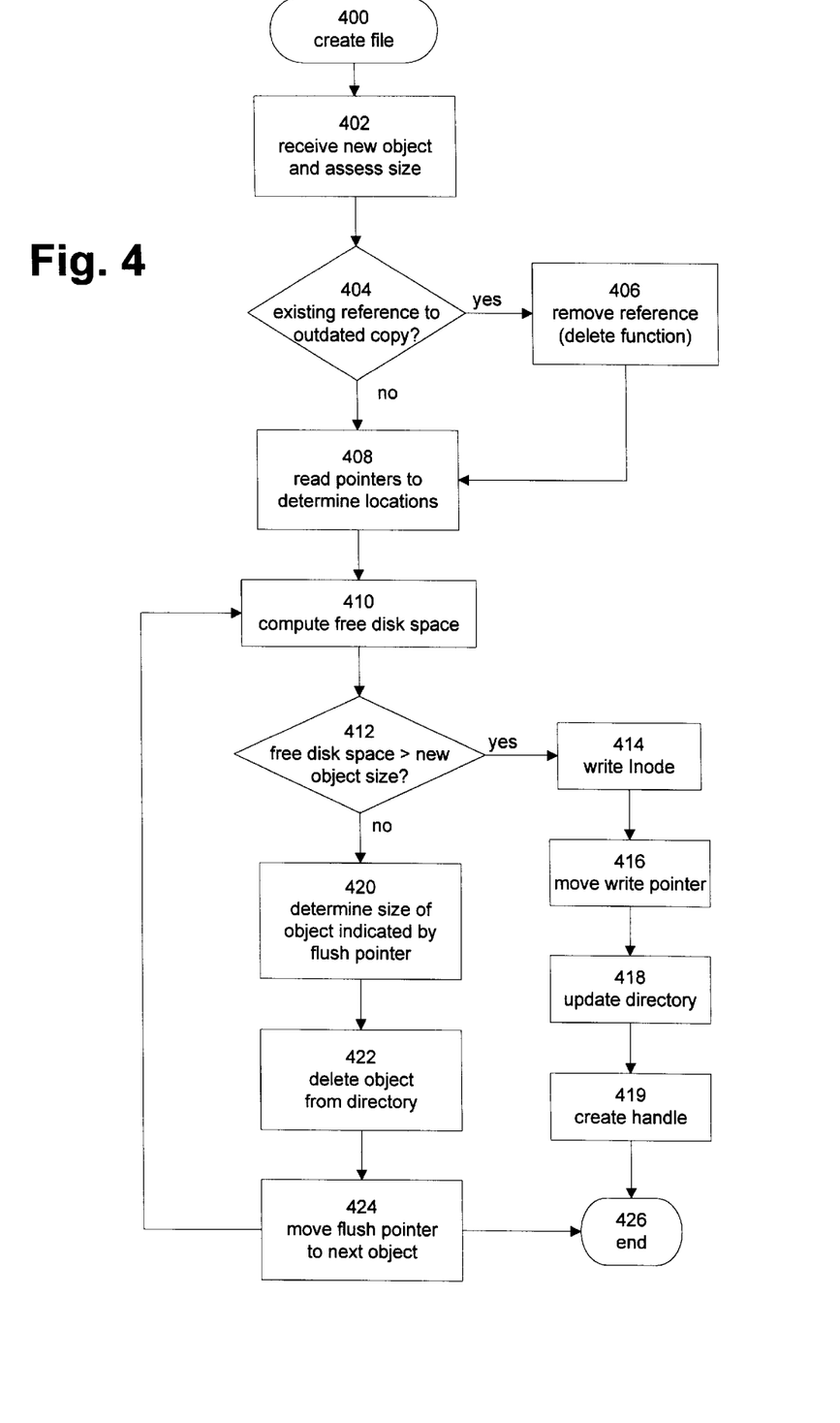
FIG. 4 is a flowchart illustrating the creation of a file according to a specific embodiment of the invention.

The creation of a file according to a specific embodiment of the invention will now be described with reference to flowchart 400 of FIG. 4. File creation allocates disk space for subsequent writing of data, and inserts an entry for the newly created file into the directory structure. A file is created after a requested object (e.g., Netscape's home page) has been retrieved by the caching engine from a remote server in response to a cache miss, and the size of the object has been determined from its header (step 402). The size of an object can vary rather dramatically because the object could be anything from a single web page to a full length feature film. It is also determined whether the object already exists in the directory, i.e., whether there is a reference to an outdated copy of the object (step 404). If there is, the reference needs to removed from the directory (406) to ensure that there is no confusion as to the most recent copy of a particular object. This "delete" function will be described in greater detail below with reference to FIG. 9.

After the object is received, the size determined, and references to any old copy removed from the directory, the disk pointers structure at the beginning of the disk drive is read to determine the current locations of write pointer, the flush pointer, and the min and max locations of disk (step 408). Based on these locations, the free disk space is then computed (step 410). If the write pointer is ahead of the flush pointer as described above with reference to FIG. 3b, the computation is trivial. That is, the free disk space is just the distance between the current location of the write pointer and the max of the disk. If, however, the flush pointer is ahead of the write pointer, i.e., the typical case, the free disk space is the distance between the current locations of the flush and write pointer as long as the distance between the write pointer and the max of the disk is enough space for the object. If this is not the case, then the pointers must wrap the disk as described above with reference to FIGS. 3g and 3h. It is then determined whether the free disk space is sufficient to accommodate the size of the object and its Inode (step 412).

If the free disk space is sufficient to accommodate the new object (step 412), the Inode for the new object is created and written to the disk beginning at the write pointer location (step 414). The write pointer is then moved (step 416) the length of the object (as determined in step 402) thereby allocating the appropriate amount of memory for the object data to be written to the disk. The directory is then updated with the Inode information (step 418). Finally, a "handle" is created (step 419) which indicates that the newly created file is active and corresponds to a particular "thread" of activity, i.e., the thread which is creating the file. The nature of the handle will be discussed in greater detail below. Even though the Inode is written to the disk as described above, a copy is maintained in volatile memory so that subsequent reads and writes will know everything about the associated file without having to go to the disk.

If, however, the free disk space is not sufficient to accommodate the new object, the Inode immediately ahead of the flush pointer is read to determine the size of the next object (step 420) and that object's directory entry is deleted (step 422). The object is then flushed by moving the flush pointer to the Inode associated with the next object (step 424). This "implicit delete" takes care of the garbage collection function. The free disk space is then recomputed to determine whether enough space has been allocated for the new object (step 412). If not, steps 420–424 are repeated until the requisite amount of memory has been freed up. As a consequence, the flush pointer will always remain just a little ahead of the write pointer, and therefore, the disk or disks will always be used very nearly to capacity.

The writing of a file according to a specific embodiment of the invention will now be described with reference to flowchart 500 of FIG. 5. As described above with reference to FIG. 4, once a file has been created, a handle is returned which points to the file's Inode. In a specific embodiment, the handle includes a handle task identifier field which maps the handle to a particular thread. The term "thread" is used herein to refer to a specific ongoing transaction (e.g., a write) with the associated file. The handle also includes an Inode pointer which points to the file's Inode. A write pointer or offset indicates how much of the file data has been written at any given time. A read pointer or offset indicates how much of the file has been read at any given time if the transaction includes reading of the file. A permission mask indicates what type of access the particular thread has to the file data (e.g., write in this case; read-only in the case of a read). Finally, the handle includes a cyclical redundancy checksum (CRC) which is calculated during the transaction and written to the Inode (for a write) or compared to the Inode CRC (for a read). Multiple handles (one for each transaction thread) can point to the same Inode simultaneously. The number of handles associated with a particular Inode and file is indicated by an Inode reference count.

When all the handles for a particular file are released, i.e., all of the transactions are either completed or terminated, the Inode is flushed, that is written back to the disk. According to some embodiments, the Inode may be temporarily stored in the buffering layer of the caching server even where there are no ongoing transactions for the associated file so that subsequent reads of the file may get the Inode information without the necessity of accessing the disk drive. The Inode includes the potential length of the object (i.e., the amount of disk space originally allocated for the object), a write offset (i.e., the actual length of the data written in the file), and a CRC which is computed at the end of the write for protection from data corruption. That is, when a subsequent thread reads the object it computes its own CRC which is then compared to the Inode CRC to determine if any corruption has occurred.

So, once the Inode has been created and sufficient disk space allocated, the object data can be written to the disk. The data is received from the caching server's network socket and is typically written in blocks of, for example, four kilobytes. The argument of the write command is the handle returned during the create, or rather an integer value which identifies a specific handle. The handle's thread identifier identifies the thread with write permission. The handle with write permission includes both a write offset and a read offset. Handle without write permission only have a read offset.

Figure 5:
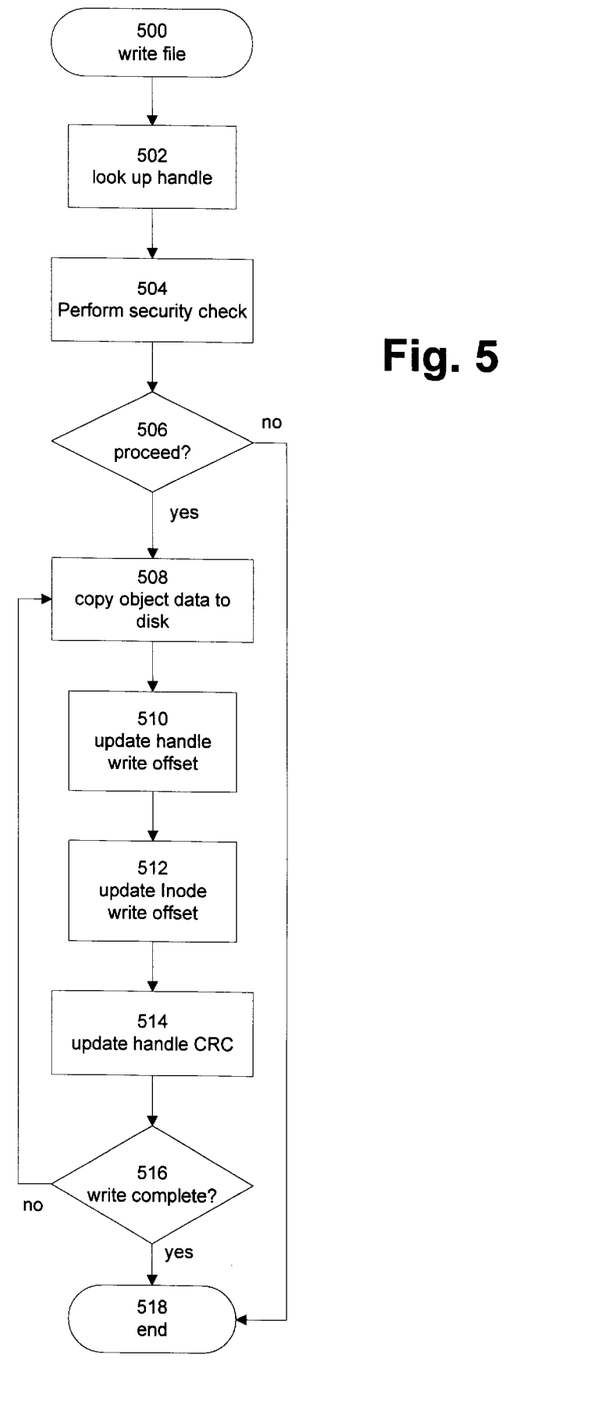
FIG. 5 is a flowchart illustrating the writing of a file according to a specific embodiment of the invention.

Referring now to FIG. 5, a look-up is performed on the handle identified by the write command (step 502). That is, the integer value argument is an index which indicates the location of the handle information in a handle array. A security check is performed (step 504) to determine whether the write transaction may proceed, i.e., whether the handle remains active and valid. A security check would fail where, for example, a parallel transaction thread had recently deleted the file. In such a case, the Inode would be gone and the handle therefore invalid. The security check only allows writing to end of space allocated as indicated by the Inode. If the security check succeeds (step 506), the incoming data are copied to the disk (step 508). As the data are written, the write offset value in the handle is updated (step 510) to indicate the amount of data currently written to the disk. The write offset in the Inode is also updated (step 512) as the data are written to provide a limit for subsequent reads. The handle's read offset remains unchanged unless a read is also being performed. The handle's CRC is also updated as the data are written (step 514). Steps 508–514 are repeated until the entire object is written to disk (step 516).

Figure 6:
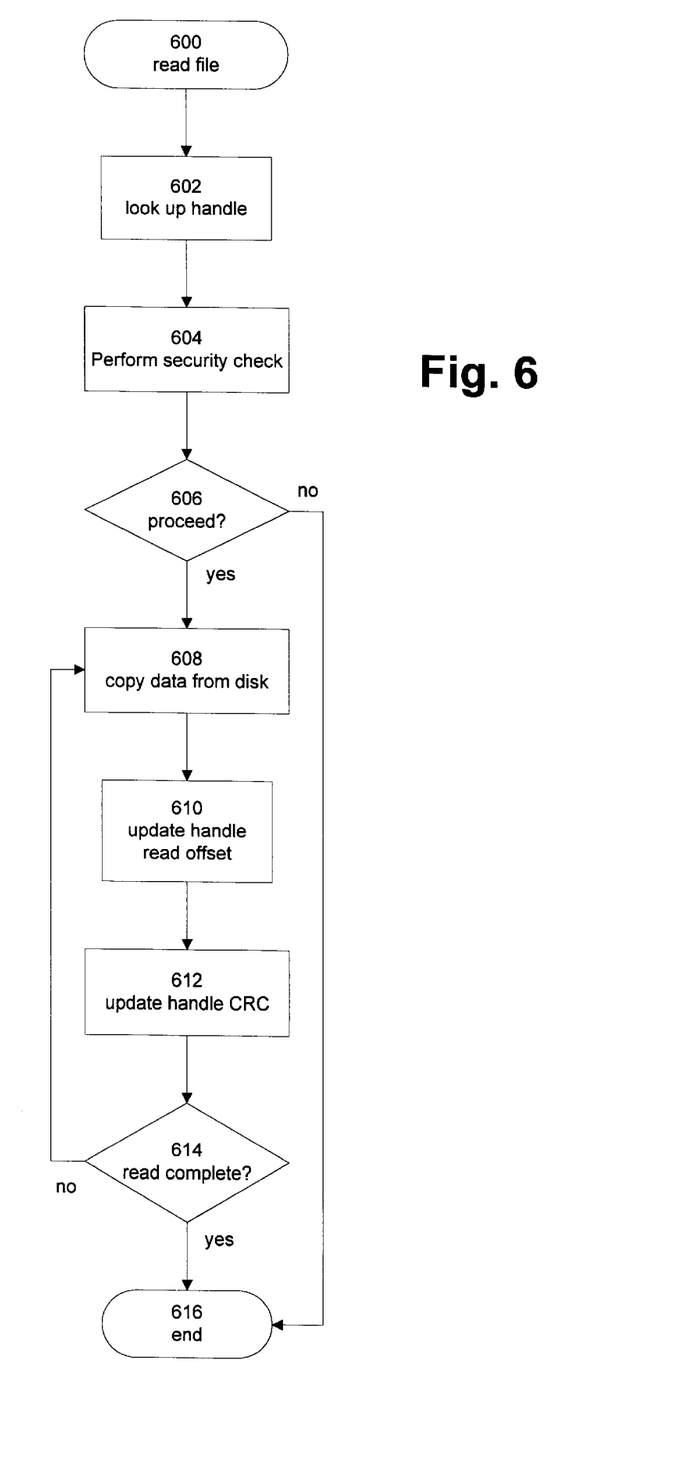
FIG. 6 is a flowchart illustrating the reading of a file according to a specific embodiment of the invention.

The reading of a file according to a specific embodiment of the invention will now be described with reference to flowchart 600 of FIG. 6. The read is similar to the write in a number of respects. The argument of the read is a handle which is returned by the open file function discussed below. A look-up is done to get the handle information from the handle array (step 602). A security check is performed to determine if the read should proceed (step 604). If the security check succeeds (step 606), the object data are read from the disk (step 608). As the data are read, the handle's read offset is updated (step 610). This value can never exceed the boundary defined by the current write offset in the Inode. The handle's CRC is also updated as the data are read from the disk (step 612). Steps 608–612 are repeated until all of the data has been read from the file (step 614).

Figure 7:
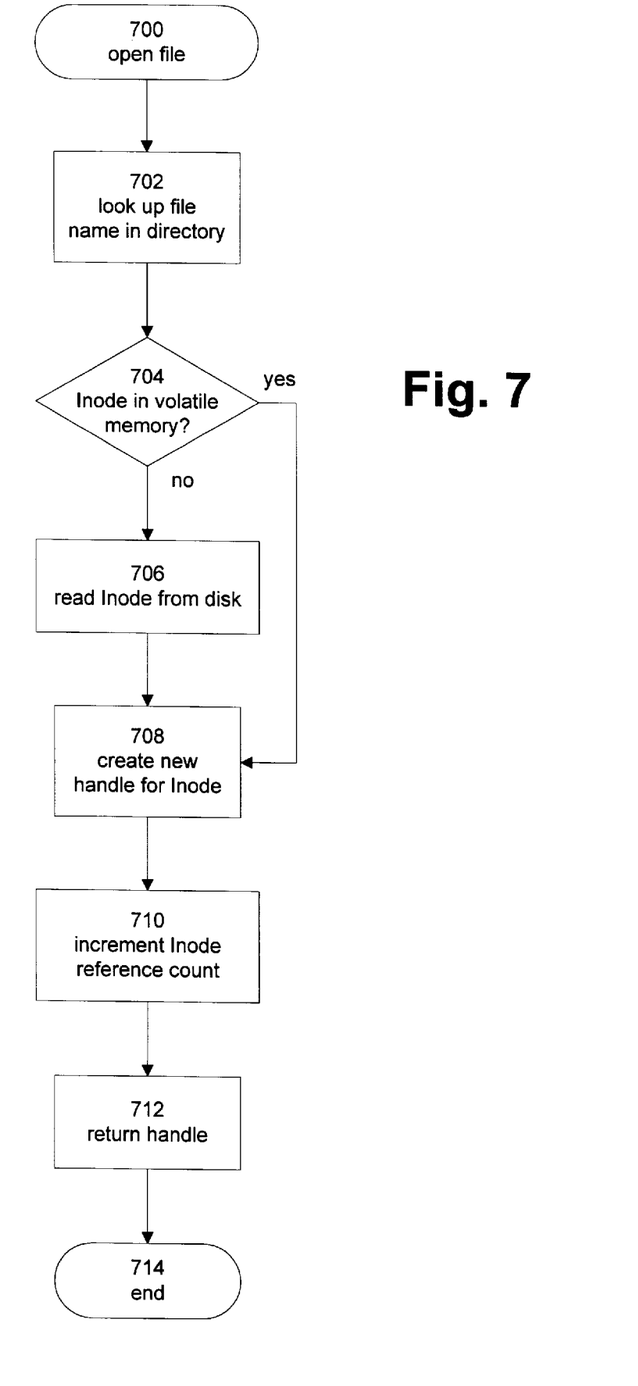
FIG. 7 is a flowchart illustrating the opening of a file according to a specific embodiment of the invention.

The opening of a file according to a specific embodiment of the invention will now be described with reference to flowchart 700 of FIG. 7. This function is performed when it has been determined that a file to be read is likely on the drive. This information is typically the result of a successful stat function (described below). Alternatively, a create was attempted, failed, and returned a message indicating that the desired object was already in the cache. The open precedes the read (described above with reference to FIG. 6) and returns the argument for the read command, i.e., the handle. The argument for the open command is the file name. Using the file name, a directory look-up is performed (step 702) to determine not only the location of the file's Inode, but also to verify that the file is still there, i.e., the file could have been deleted or overwritten since the successful stat function. The directory look-up essentially traverses the MD5 directory hash using the file name to find the Inode's offset. It is then determined whether the Inode is currently in volatile memory (step 704), i.e., whether the file is already open and active, by reading an Inode list. The Inode list is simply a list of the Inodes for all currently active files. If the Inode is not in volatile memory, it is read from the disk and placed in the volatile memory in the Inode list (step 706). A new handle is then created and mapped to the Inode (step 708), and the Inode reference count (which indicates the current number of active handles for a particular Inode) is incremented (step 710). As mentioned above, when the reference count reaches zero, the Inode is flushed from volatile memory to the disk. The handle is then returned (step 712), that is, the handle array index is returned which indicates the location of the handle information in the handle array.

Figure 8:
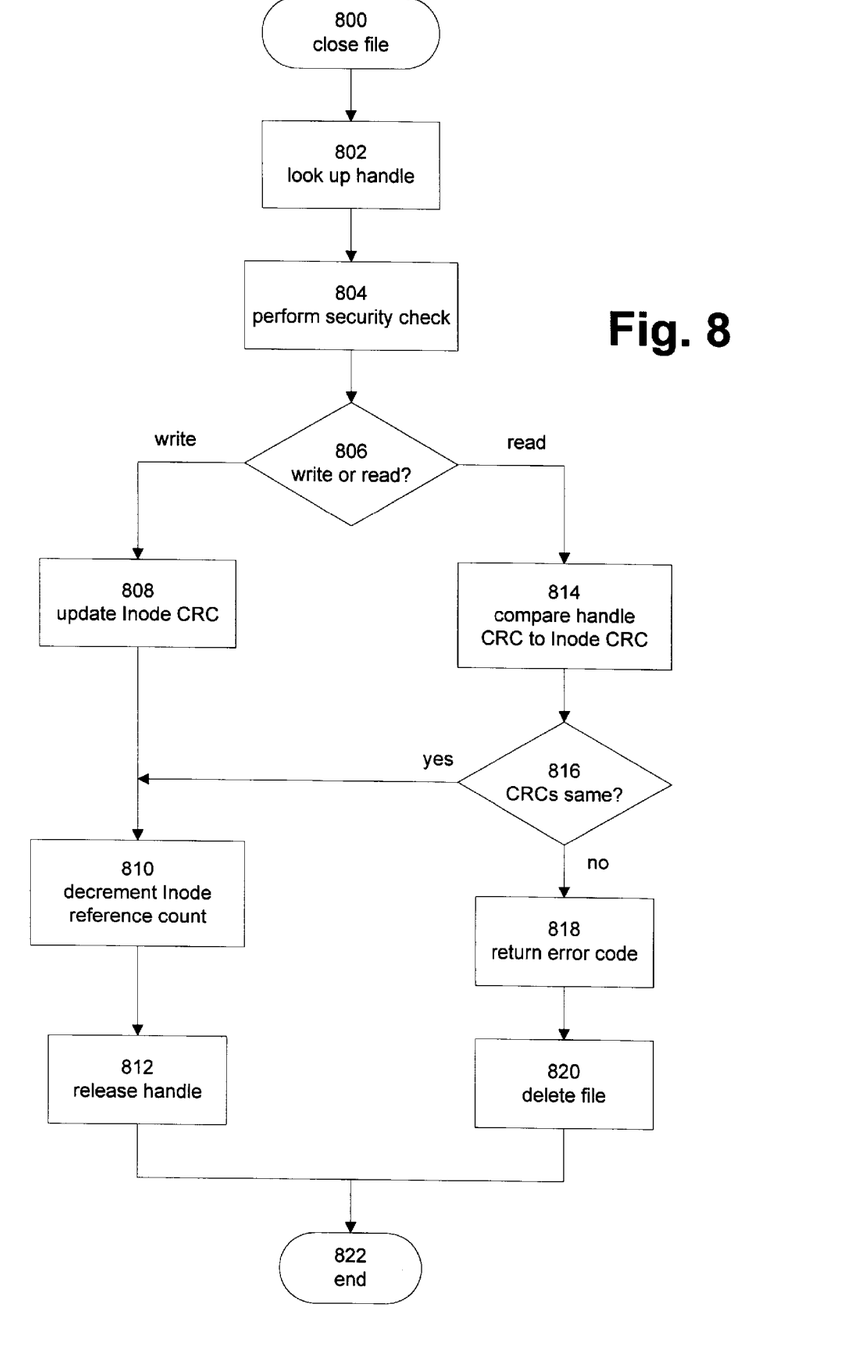
FIG. 8 is a flowchart illustrating the closing of a file according to a specific embodiment of the invention.

The closing of a file according to a specific embodiment of the invention will now be described with reference to flowchart 800 of FIG. 8. Once a read or write is completed the close function completes the transaction. The argument of the close command is the handle corresponding to the transaction. A look-up in the handle array is performed to get the handle information (step 802). A security check is performed (step 804) to ensure that the file to be closed still exists. If the transaction was a write (step 806), the Inode's CRC is updated to be the same as the write handle's CRC (step 808) and the Inode reference count is decremented (step 810). The handle is then released (step 812), i.e., the volatile memory used to store the handle is released.

If, on the other hand, the transaction was a read, the handle's CRC is compared to the Inode's CRC (step 814). If the CRCs are the same (step 816) the routine proceeds to steps 808 and 810 described above. If, however, the CRCs are not the same, an error code is returned (step 818) and, according to one embodiment, a delete file command is executed (step 820).

Figure 9:
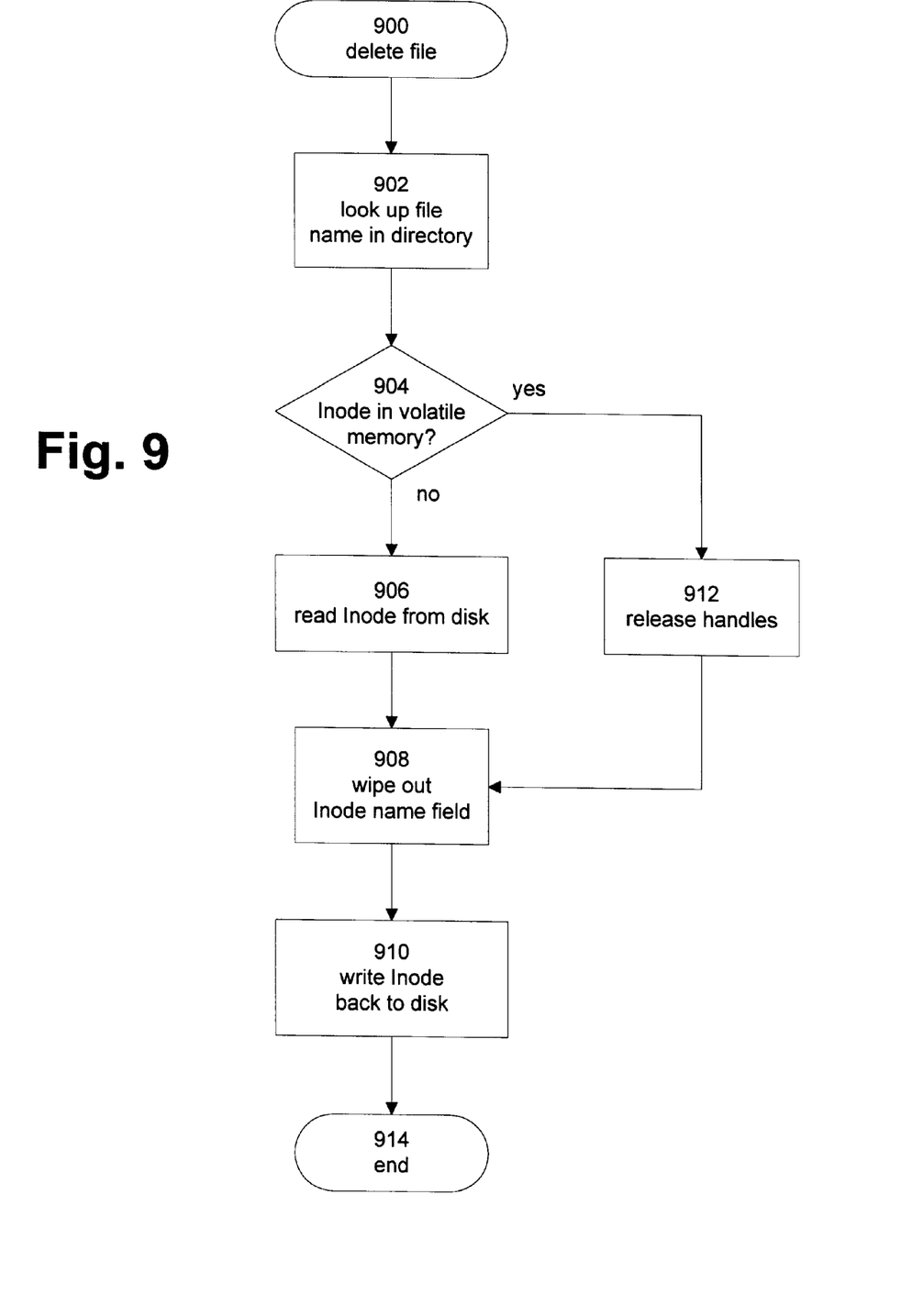
FIG. 9 is a flowchart illustrating the deleting of a file according to a specific embodiment of the invention.

The deleting of a file according to a specific embodiment of the invention will now be described with reference to flowchart 900 of FIG. 9. The delete command is typically executed when something appears fundamentally wrong with a file such as, for example, when a CRC comparison has failed as described above with reference to FIG. 8. The argument of the delete command is the file name. A directory look-up is performed in which the file name is used to identify an Inode, i.e., the Inode's offset (step 902). It is then determined whether the Inode is currently in volatile memory (step 904), i.e., whether the file is already open and active, by reading the Inode list. If the Inode is not in volatile memory, it is read from the disk and placed in the volatile memory (step 906) where the 256-byte file name field is then wiped out (step 908). The Inode is then written back to the disk (step 910) where it will no longer be accessible. If the Inode is already in volatile memory, i.e., the file is currently active, all of the handles associated with the Inode are released (step 912). The routine then proceeds to steps 908 and 910.

Figure 10:
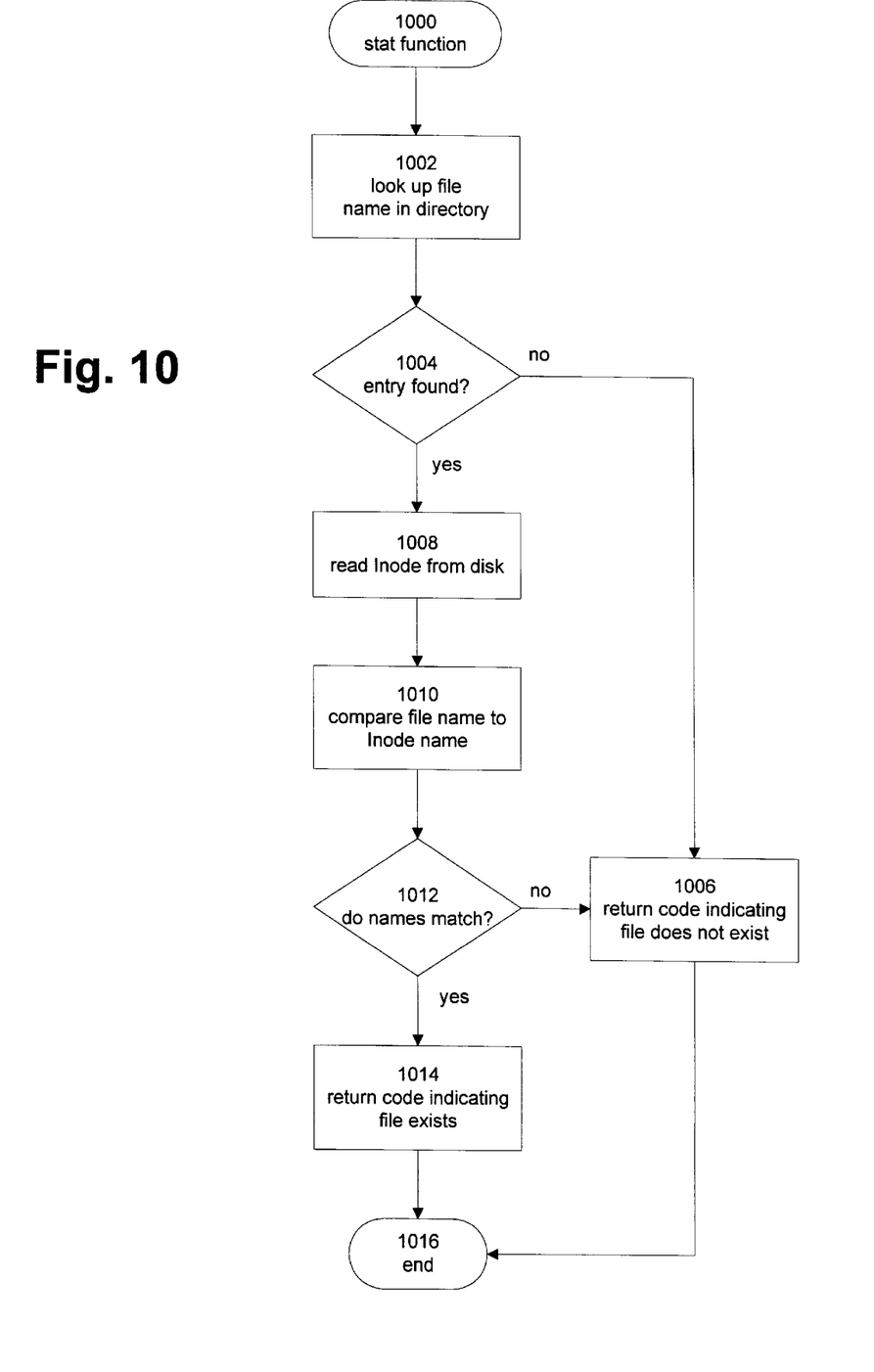
FIG. 10 is a flowchart illustrating a stat function according to a specific embodiment of the invention.

A file stat function according to a specific embodiment of the invention will now be described with reference to flowchart 1000 of FIG. 10. This function may precede an open command to determine whether a file exists in the directory structure. The argument of the stat command is the file name. The routine performs a directory look-up to determine whether the file is currently in the file system (step 1002). If no entry is found (step 1004), the routine returns a code indicating the file does not exist (step 1006).

If an entry, i.e., an Inode offset, exists, the routine retrieves the Inode from the disk and places it in volatile memory (step 1008). This disk access is usually not wasted in that open and read commands are likely to follow. The first 256 bytes of the stat command argument, i.e., the file name, are then compared to the Inode name field (step 1010). If they match (step 1012), a code indicating that the file is currently in the file system is returned (step 1014). If there is no match, the code of step 1006 is returned.

A significant advantage of the file system of the present invention is that it is extremely robust in the face of catastrophic system failures. This is due to the fact that the entire directory structure for even today's large drives (e.g., 22 gigabytes) may be reconstructed within a few minutes. Upon rebooting, the system uses the disk pointers to sequentially "walk" the Inodes in the drive and replenish the volatile memory directory structure (i.e., the MD5 hash) from the information in the Inodes.

While the invention has been particularly shown and described with reference to specific embodiments thereof, it will be understood by those skilled in the art that changes in the form and details of the disclosed embodiments may be made without departing from the spirit or scope of the invention. Specifically, the file system of the present invention has been described with reference to the caching of multimedia objects from the World Wide Web. It will be understood, however, that there are a variety of other applications in which the file system of the present invention may be employed. For example, the file system described herein would be useful as a repository for electronic mail in that old mail could be preserved for a reasonable period of time before automatically being written over. Such an application of the present invention will be appreciated particularly by administrators of electronic mail systems. Therefore, the scope of the invention should be determined with reference to the appended claims.

What is claimed is:

1. A method for storing a first object in a cache memory using a write pointer to indicate a most recently allocated memory portion, and a flush pointer to indicate a most recently flushed object, the method comprising:

(A) determining a size of the first object;

(B) determining a first memory amount available for writing the first object with reference to the write and flush pointers;

(C) where the first memory amount is insufficient to accommodate the first object, moving the flush pointer to the end of a next flushed object immediately following the most recently flushed object, the next flushed object then becoming the most recently flushed object;

(D) performing (B) and (C) until the first memory amount is sufficient to accommodate the first object;

(E) where the first memory amount is sufficient to accommodate the first object, moving the write pointer to allocate a second memory amount corresponding to a first portion of the cache memory, the second memory amount being smaller than the first memory amount and also being sufficient to accommodate the first object; and (F) writing the first object in the first portion of the cache memory.

2. The method of claim 1 wherein determining the first memory amount comprises determining first available memory between the write and flush pointers.

3. The method of claim 2 wherein the cache memory comprises a beginning and an end, and determining the first memory amount comprises determining second available memory between the write pointer and the end of the cache memory.

4. The method of claim 3 further comprising, where the first memory amount is determined to be insufficient to accommodate the first object based on the second available memory, writing the first object at the beginning of the cache memory.

5. The method of claim 1 further comprising:

determining whether a copy of the first object already exists in the cache memory; and where the copy exists in the cache memory, preventing subsequent access to the copy.

6. The method of claim 5 wherein determining whether the copy exists in the cache memory comprises referring to a directory of objects which are stored in the cache memory.

7. The method of claim 6 wherein the directory is stored in volatile memory separate from the cache memory.

8. The method of claim 6 wherein preventing subsequent access to the copy comprises deleting a reference to the copy from the directory.

9. The method of claim 6 wherein preventing subsequent access to the copy comprises altering a data field in the cache memory associated with the copy thereby making the copy inaccessible.

10. A cache memory system for storing a first object in a cache memory using a write pointer to indicate a most recently allocated memory portion, and a flush pointer to indicate a most recently flushed object, the cache memory system comprising:

the cache memory; and a controller which is operable to:

(A) determine a size of the first object;

(B) determine a first memory amount available for writing the first object with reference to the write and flush pointers;

(C) where the first memory amount is insufficient to accommodate the first object, move the flush pointer to the end of a next flushed object immediately following the most recently flushed object, the next flushed object then becoming the most recently flushed object;

(D) perform (B) and (C) until the first memory amount is sufficient to accommodate the first object;

(E) where the first memory amount is sufficient to accommodate the first object, move the write pointer to allocate a second memory amount corresponding to a first portion of the cache memory, the second memory amount being smaller than the first memory amount and also being sufficient to accommodate the first object; and (F) write the first object in the first portion of the cache memory.

11. A method for storing a plurality of multimedia objects in a cache memory, the cache memory having a beginning and an end, the method comprising:

(A) writing first ones of the multimedia objects into the cache memory sequentially from the beginning of the cache memory in the order in which the first ones of the multimedia objects are received;

(B) when a first memory amount from a most recently stored one of the first multimedia objects to the end of the cache memory is insufficient to accommodate a new multimedia object, writing the new multimedia object from the beginning of the cache memory, thereby writing over one of the first ones of the multimedia objects;

(C) writing second ones of the multimedia objects into the cache memory sequentially following the new multimedia object in the order in which the second ones of the multimedia objects are received, thereby writing over the first ones of the multimedia objects; and (D) repeating (B) and (C).

12. The method of claim 11 further comprising creating a corresponding entry in a directory for each of the multimedia objects written into the cache memory.

13. The method of claim 12 wherein the directory is stored in volatile memory separate from the cache memory.

14. The method of claim 11 further comprising deleting a corresponding entry from a directory for each of the plurality of multimedia objects which are written over.

15. The method of claim 11 further comprising:

indicating an allocated portion of the cache memory with a write pointer;

indicating a flushed multimedia object with a flush pointer; and for each particular multimedia object written into the cache memory, moving the flush pointer past at least one previously stored multimedia object thereby flushing the at least one multimedia object; and moving the write pointer to allocate memory for the particular multimedia object.

16. A cache memory system for storing a plurality of multimedia objects comprising:

a cache memory having a beginning and an end;

a controller which is operable to:

(A) write first ones of the multimedia objects into the cache memory sequentially from the beginning of the cache memory in the order in which the first ones of the multimedia objects are received;

(B) when a first memory amount from a most recently stored one of the first multimedia objects to the end of the cache memory is insufficient to accommodate a new multimedia object, write the new multimedia object from the beginning of the cache memory, thereby writing over a previously stored one of the first multimedia objects;

(C) write second ones of the multimedia objects into the cache memory sequentially following the new multimedia object in the order in which the second ones of the multimedia objects are received, thereby writing over the first ones of the multimedia objects; and (D) repeat (B) and (C).

17. A method for accessing multimedia objects stored in a cache memory comprising:

in volatile memory associated with and separate from the cache memory, providing a directory of the multimedia objects comprising data stored with the multimedia objects in the cache memory; and accessing the multimedia objects using the directory.

18. The method of claim 17 further comprising, where the directory is lost from the volatile memory, subsequently rebuilding the directory in the volatile memory from the data in the cache memory.

19. The method of claim 18 wherein the data comprises a plurality of data fields each of which is stored with an associated one of the multimedia objects.

20. The method of claim 19 wherein rebuilding the directory comprises sequentially reading the data fields associated with the multimedia objects and constructing the directory from information stored therein.

21. A cache memory system for storing multimedia objects comprising:

a cache memory for storing the multimedia objects in a sequential manner in the order in which the multimedia objects are received, later stored ones of the multimedia objects being written over earlier stored ones of the multimedia objects; and volatile memory associated with and separate from the cache memory for storing a directory for facilitating access to the multimedia objects stored in the cache memory.

22. A method for storing a first object in a cache memory using a write pointer to indicate a most recently allocated memory portion, and a flush pointer to indicate a most recently flushed object, the method comprising:

(A) determining a size of the first object;

(B) determining a first memory amount available for writing the first object with reference to the write and flush pointers;

(C) where the first memory amount is insufficient to accommodate the first object, moving the flush pointer to the end of a next flushed object immediately following the most recently flushed object, the next flushed object then becoming the most recently flushed object;

(D) performing (B) and (C) until the first memory amount is sufficient to accommodate the first object;

(E) where the first memory amount is sufficient to accommodate the first object, moving the write pointer to allocate a second memory amount corresponding to a first portion of the cache memory, the second memory amount being smaller than the first memory amount and also being sufficient to accommodate the first object; and (F) writing the first object in the first portion of the cache memory.

23. At least one computer readable medium containing program instructions for storing a plurality of multimedia objects in a cache memory, the cache memory having a beginning and an end, said at least one computer readable medium comprising:

computer readable code for writing first ones of the multimedia objects into the cache memory sequentially from the beginning of the cache memory in the order in which the first ones of the multimedia objects are received;

computer readable code for, when a first memory amount from a most recently stored one of the first multimedia objects to the end of the cache memory is insufficient to accommodate a new multimedia object, writing the new multimedia object from the beginning of the cache memory, thereby writing over one of the first ones of the multimedia objects; and computer readable code for writing second ones of the multimedia objects into the cache memory sequentially following the new multimedia object in the order in which the second ones of the multimedia objects are received, thereby writing over the first ones of the multimedia objects.

24. At least one computer readable medium containing program instructions for storing a first object in a cache memory using a write pointer to indicate a most recently allocated memory portion, and a flush pointer to indicate a most recently flushed object, said at least one computer readable medium comprising:

computer readable code for determining a size of the first object;

computer readable code for determining a first memory amount available for writing the first object with reference to the write and flush pointers;

computer readable code for, where the first memory amount is insufficient to accommodate the first object, moving the flush pointer to the end of a next flushed object immediately following the most recently flushed object, the next flushed object then becoming the most recently flushed object;

computer readable code for determining the first memory amount and moving the flush pointer until the first memory amount is sufficient to accommodate the first object;

computer readable code for, where the first memory amount is sufficient to accommodate the first object, moving the write pointer to allocate a second memory amount corresponding to a first portion of the cache memory, the second memory amount being smaller than the first memory amount and also being sufficient to accommodate the first object; and computer readable code for writing the first object in the first portion of the cache memory.

* * * * *